(12) United States Patent
Gopalakrishnan et al.

(10) Patent No.: US 9,384,391 B2
(45) Date of Patent: Jul. 5, 2016

(54) METHODS AND SYSTEMS FOR PROCESSING DOCUMENTS

(71) Applicant: Xerox Corporation, Norwalk, CT (US)

(72) Inventors: Sainarayanan Gopalakrishnan, Chennai (IN); Rajasekar Kanagasabai, Chennai (IN); Vignesh Doss, Theni (IN); Sudhagar Subbaian, Coimbatore (IN); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/505,517

(22) Filed: Oct. 3, 2014

(65) Prior Publication Data

US 2016/0098596 A1    Apr. 7, 2016

(51) Int. Cl.
*G06K 9/34* (2006.01)
*G06K 9/48* (2006.01)
*G06K 9/00* (2006.01)
*G06F 17/21* (2006.01)

(52) U.S. Cl.
CPC .......... *G06K 9/00456* (2013.01); *G06F 17/212* (2013.01)

(58) Field of Classification Search
CPC .......... G06K 9/00456; G06K 9/00664; G06K 9/00711; G06F 117/212; G06F 17/30265; G06F 17/30247; H04N 1/40062

USPC .......... 382/224, 183, 174, 100, 105, 168, 173, 382/181, 190, 199, 232, 254, 321, 276, 309
See application file for complete search history.

(56) References Cited

U.S. PATENT DOCUMENTS

| | | | |
|---|---|---|---|
| 5,191,525 A | 3/1993 | LeBrun et al. | |
| 6,081,616 A * | 6/2000 | Vaezi | G06K 9/00456 382/171 |
| 6,658,166 B1 | 12/2003 | Zlotnick et al. | |
| 7,305,129 B2 * | 12/2007 | Chellapilla | G06F 17/243 382/174 |
| 8,122,339 B2 | 2/2012 | Bastos dos Santos et al. | |
| 8,171,392 B2 | 5/2012 | Bastos dos Santos et al. | |
| 8,214,733 B2 | 7/2012 | Bastos dos Santos et al. | |
| 9,053,361 B2 * | 6/2015 | Baheti | G06K 9/00456 |
| 2013/0083999 A1 * | 4/2013 | Bhardwaj | G06Q 30/0643 382/165 |
| 2013/0194448 A1 * | 8/2013 | Baheti | G06K 9/00456 348/222.1 |
| 2013/0195315 A1 * | 8/2013 | Baheti | G06K 9/00456 382/103 |
| 2013/0294652 A1 | 11/2013 | Fan et al. | |

* cited by examiner

*Primary Examiner* — Sheela C Chawan (57) ABSTRACT

Methods and systems for classifying a region of interest in an electronic document. A first region from the electronic document is extracted. The first region includes at least the region of interest. A first projection profile of pixels is determined in the region of interest. The first projection profile of pixels is indicative of a presence of a content in the region of interest. The region of interest is classified in at least one category based on a comparison of the first projection profile with a predetermined projection profile associated with the region of interest.

23 Claims, 6 Drawing Sheets

METHODS AND SYSTEMS FOR PROCESSING DOCUMENTS

TECHNICAL FIELD

The presently disclosed embodiments are related, in general, to processing of documents. More particularly, the presently disclosed embodiments are related to methods and systems for extracting content from regions of interest in the documents.

BACKGROUND

In automated form processing, the handwritten documents, which may include handwritten content, are scanned to generate electronic documents. Subsequently, the electronic documents may be processed to extract information included in those electronic documents. Typically, the information in the handwritten documents is included in different regions of interest (e.g., fields of an application form) and the electronic documents may be processed to extract such regions of interest using pre-defined templates of the electronic documents. Thereafter, the information from the extracted regions of interest may be determined using known techniques, such as optical character recognition (OCR), intelligent character recognition (ICR), and the like. In a similar way, electronic documents including printed information (e.g., application number and barcode) may be processed to determine the information included in regions of interests.

However, in certain scenarios, the users may write outside the specified regions of interest. Further, it might be possible that during scanning of the handwritten documents, skew is introduced in the electronic documents (e.g., due to deformation of the handwritten documents). In such scenarios, extracting the information, using the pre-defined templates may lead to incorrect extraction of regions of interests, and subsequent incorrect recognition of the information.

SUMMARY

According to embodiments illustrated herein, there is provided a method for classifying a region of interest in an electronic document. The method includes extracting a first region from said electronic document. Said first region comprises at least said region of interest. The method further includes determining a first projection profile of pixels in said region of interest. Said first projection profile is indicative of a presence of a content in said region of interest. The method further includes classifying said region of interest in at least one category based on a comparison of said first projection profile with a predetermined projection profile associated with said region of interest. The method is performed by one or more processors.

According to embodiments illustrated herein, there is provided a system for classifying a region of interest in an electronic document. The system includes one or more processors operable to extract a first region from said electronic document. Said first region comprises at least said region of interest. The one or more processors are further operable to determine a first projection profile of pixels in said region of interest. Said first projection profile is indicative of a presence of a content in said region of interest. The one or more processors are further operable to classify said region of interest in at least one category based on a comparison of said first projection profile with a predetermined projection profile associated with said region of interest.

According to embodiments illustrated herein, there is provided a computer program product for use with a computer. The computer program product includes a non-transitory computer readable medium. The non-transitory computer readable medium stores a computer program code for classifying a region of interest in an electronic document. The computer program code is executable by one or more processors to extract a first region from said electronic document. Said first region comprises at least said region of interest. The computer program code is further executable by the one or more processors to determine a first projection profile of pixels in said region of interest. Said first projection profile is indicative of a presence of a content in said region of interest. The computer program code is further executable by the one or more processors to classify said region of interest in at least one category based on a comparison of said first projection profile with a predetermined projection profile associated with said region of interest.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "Multi Function Device" (MFD) refers to a computing device that can perform multiple functions. Examples of the functions may include, but are not limited to, printing, scanning, copying, faxing, emailing, and the like. In an embodiment, the MFD includes a scanner and a printer for scanning and printing one or more documents respectively. In an embodiment, the MFD has communication capabilities that enable the MFD to send/receive data and messages in accordance with one or more communication protocols such as, but not limited to, HTTP, FTP, WebDAV, E-Mail, SMB, NFS, and TWAIN.

An "electronic document" refers to a collection of content, including image content, retained in an electronic form. The electronic document may include one or more pictorial, symbols, text, line art, blank, or non-printed regions etc. In an embodiment, the electronic documents may be obtained by scanning a corresponding document. In an embodiment, examples of the documents may include, but are not limited to, bank account forms, bills, e-tickets, hotel reservation forms, boarding passes, student examination papers, insurance forms, e-statements corresponding to banking, and credit cards. Such documents may include different types of information about the respective users (e.g., name, address, telephone number, application number, and the like). The electronic document may be stored in various file formats, such as, JPG or JPEG, GIF, TIFF, PNG, BMP, RAW, PSD, PSP, PDF, and the like.

A "region of interest" refers to an area in the electronic document that may include content that is to be extracted. For example, the region of interest may include different fields in the electronic document, such that users may have written content in those fields. Further, regions of interest may include printed information (e.g., serial number of the form, application number, and the like). In an embodiment, the users may leave the region of interest blank and, thus, the region of interests may not include handwritten/printed information. In an embodiment, the regions of interest may include a machine-readable code (e.g., barcode and QR code) that may be extracted to determine information embedded in the machine-readable codes.

A "first set of coordinates" refers to Cartesian coordinates associated with the region of interest. In an embodiment, the first set of coordinates may be used to extract the region of interest from the electronic document.

A "tolerance region" refers to a pre-defined area along the boundary of the region of interest. The tolerance region surrounds the region of interest in accordance with the pre-defined area.

A "first region" refers to an area in the electronic document that is a combination of region of interest and tolerance region. That is, an area that includes the tolerance region surrounding the region of interest in the electronic document may constitute the first region.

A "signature region" refers to an area in the electronic document that includes a heading/title associated with the region of interest. In an embodiment, the signature region corresponds to the field against which the content is written, by the user. For example, if the electronic document includes a field "NAME" against which name of the user is written, the area that includes the field "NAME" will correspond to signature region and the area where the user is expected to write his/her name will correspond to region of interest.

A "second set of coordinates" refers to Cartesian coordinates associated with the signature region. In an embodiment, the second set of coordinates may have a predetermined relationship with the first set of coordinates. For example, the second set of coordinates may be at a predetermined distance and in predetermined direction from the first set of coordinates.

A "template electronic document" refers to an electronic document that the MFD may utilize for determining different regions of interest and signature regions included in the electronic document received from the user. In an embodiment, utilizing the template electronic document, first set of coordinates associated with different regions of interest and second set of coordinates associated with different signature regions may be determined. Subsequently, using such first/second coordinates, regions of interest and respective signature regions may be extracted from the electronic document that needs to be processed. In an embodiment, the template electronic document may include the information pertaining to the height/width of tolerance region around the region of interest.

A "projection profile of pixels" refers to a pattern associated with the summation of intensity values of pixels available in the electronic document. The projection profile of pixels may correspond to a graphical plot (e.g., histogram) illustrating summation of the intensity values of pixels. In an embodiment, the projection profile of pixels may be determined across the vertical and horizontal direction of the region of interest to determine intensity values of pixel in the respective direction. In an embodiment, the first projection profile corresponds to the projection profile of content present in the region of interest and second projection profile corresponds to the projection profile of content present in the tolerance region.

Figure 1:
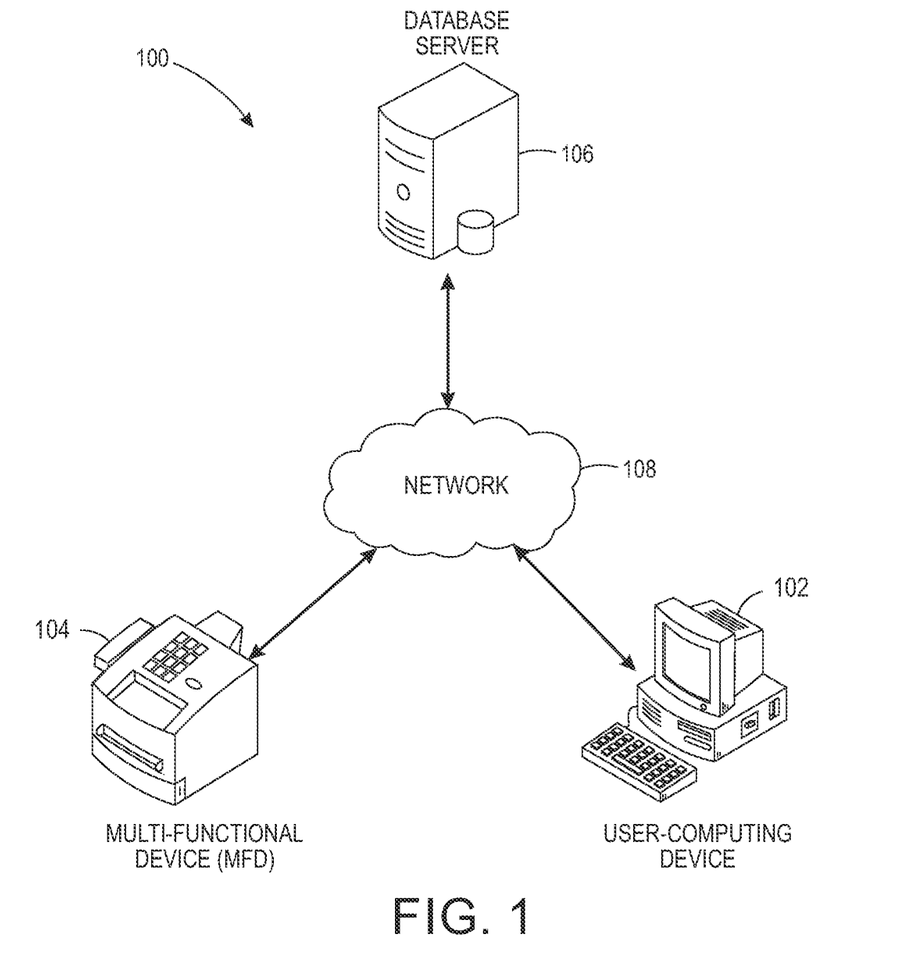
FIG. 1 is a block diagram illustrating a system environment in which various embodiments may be implemented.

FIG. 1 is a block diagram illustrating a system environment 100 in which various embodiments may be implemented. The system environment 100 includes a user-computing device 102, a multi-function device (MFD) 104, a database server 106, and a network 108. Various devices in the system environment 100 (e.g., the user-computing device 102, the MFD 104, and the database server 106) may be interconnected over the network 108.

The user-computing device 102 refers to a computing device used by a user. In an embodiment, the user-computing device 102 may be used to access the MFD 104 over the network 108. In an embodiment, the user may transmit the electronic document, which needs to be processed, to the MFD 104. In addition, the user may provide inputs for processing the electronic document. For example, using the user-computing device 102, the user may define the first/second set of coordinates in the electronic document. Further, the user may provide the inputs pertaining to the definition of the tolerance region in the electronic document. In an embodiment, the user may transmit a template electronic document that includes such definition of first/second coordinates and the tolerance region. The user may access a user interface (UI) on the user-computing device 102 and may provide the required inputs. The user may utilize the input devices (e.g., keyboard, mouse, touch interface, and the like) associated with the user-computing device 102 to provide inputs. The user-computing device 102 may include various types of the computing devices, such as, but not limited to, a desktop computer, a laptop, a personal digital assistant (PDA), a smart-phone, and a tablet computer (e.g., iPad®, Samsung Galaxy Tab®).

The MFD 104 refers to a computing device that processes the electronic document. In an embodiment, the MFD 104 may receive the electronic document from the user-computing device 102. In an alternate embodiment, the MFD 104 may itself generate the electronic document (e.g., by scanning the printed/handwritten document). Further, in an embodiment, the MFD 104 may receive the template electronic document from the user-computing device 102, such that the template electronic document may be used to determine the first/second set of coordinates and the tolerance region. In an alternate embodiment, the MFD 104 may itself generate the template electronic document (e.g., by scanning a template printed/handwritten document) and subsequently define the first/second set of coordinates and the tolerance region. In an embodiment, the MFD 104 may receive such information (e.g., template electronic document and the electronic documents to be processed) from the database server 106. Based on the first set of coordinates and the tolerance region, the MFD 104 may extract the first region from the electronic document. Subsequently, the MFD 104 may determine a first projection profile of pixels and a second projection profile of pixels in the region of interest and the tolerance region, respectively. Based on the determined first/second projection profile of pixels, the MFD 104 may process the electronic document. Further details about the processing of the electronic document have been discussed in conjunction with FIG. 3. The MFD 104 may include various types of the computing devices, such as, but not limited to, printers, scanners, copiers, fax-machines, desktop computer, laptop, PDA, smart-phone, tablet computers, and the like.

The database server 106 refers to a computing device that may store various types of information pertaining to electronic documents. In an embodiment, the database server 106 may store the template electronic document and may transmit the template electronic document to the MFD 104, as and when required. Further, the database server 106 may store the definition of the first/second set of coordinates (e.g., as provided by the user) corresponding to different types of template electronic documents. In an embodiment, the database server 106 may store predetermined projection profiles associated with region of interest in the electronic document. In such a scenario, for each of the multiple region of interests in the electronic document, the database server 106 may store the projection profiles of pixels corresponding to the expected content/information that is supposed to be written by the user. In an embodiment, the database server 106 may receive a query from the MFD 104 for receiving such information. For querying the database server 106, one or more querying languages may be utilized such as, but not limited to, SQL, QUEL, DMX and so forth. Further, the database server 106 may be realized through various technologies such as, but not limited to, Microsoft® SQL server, Oracle, and My SQL. In an embodiment, the database server 106 may connect to the MFD 104, using one or more protocols such as, but not limited to, ODBC protocol and JDBC protocol.

It will be apparent to a person skilled in the art that the functionalities of the database server 106 may be incorporated into the MFD 104, without departing from the scope of the disclosure. In such a scenario, various types of the information, as disclosed above, may be stored in the MFD 104.

The network 108 corresponds to a medium through which content and messages flow between various devices of the system environment 100 (e.g. the user-computing device 102, the MFD 104, and the database server 106). Examples of the network 108 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 108 in accordance with various wired and wireless communication protocols such as Transmission Control Protocol and Internet Protocol (TCP/IP), User Datagram Protocol (UDP), and 2G, 3G, or 4G communication protocols.

Figure 2:
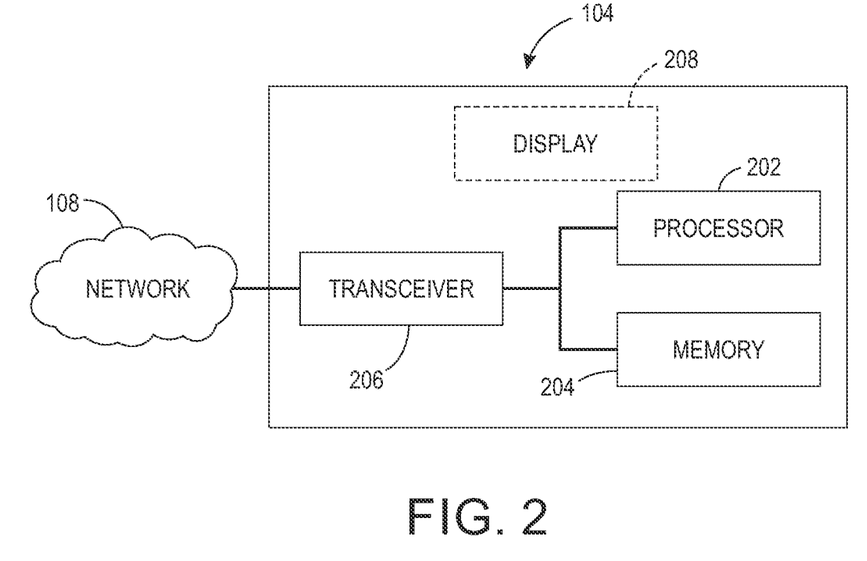
FIG. 2 is a block diagram illustrating a multifunction device, in accordance with at least one embodiment.

FIG. 2 is a block diagram illustrating the MFD 104, in accordance with at least one embodiment. The MFD 104 includes a processor 202, a memory 204, a transceiver 206, and a display 208.

The processor 202 is coupled to the memory 204 and the transceiver 206. The processor 202 includes suitable logic, circuitry, and/or interfaces that are operable to execute one or more instructions stored in the memory 204 to perform predetermined operation. The memory 204 may be operable to store the one or more instructions. The processor 202 may be implemented using one or more processor technologies known in the art. Examples of the processor 202 include, but are not limited to, an X86 processor, a RISC processor, an ASIC processor, a CISC processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It will be apparent to a person having ordinary skills in the art that the one or more instructions stored in the memory 204 enables the hardware of the MFD 104 to perform the predetermined operation.

The transceiver 206 transmits and receives messages and data to/from various components of the system environment 100. Examples of the transceiver 206 may include, but are not limited to, an antenna, an Ethernet port, an USB port or any other port that can be configured to receive and transmit data. The transceiver 206 transmits and receives data/messages in accordance with the various communication protocols, such as, TCP/IP, UDP, and 2G, 3G, or 4G communication protocols.

The display 208 facilitates a user to view information and interact with the MFD 104. The display 208 may be realized through several known technologies, such as Cathode Ray Tube (CRT) based display, Liquid Crystal Display (LCD), Light Emitting Diode (LED)-based display, Organic LED display technology, and Retina Display technology. In an embodiment, the display 208 can be a touch screen that is operable to receive a user-input.

Figure 3:
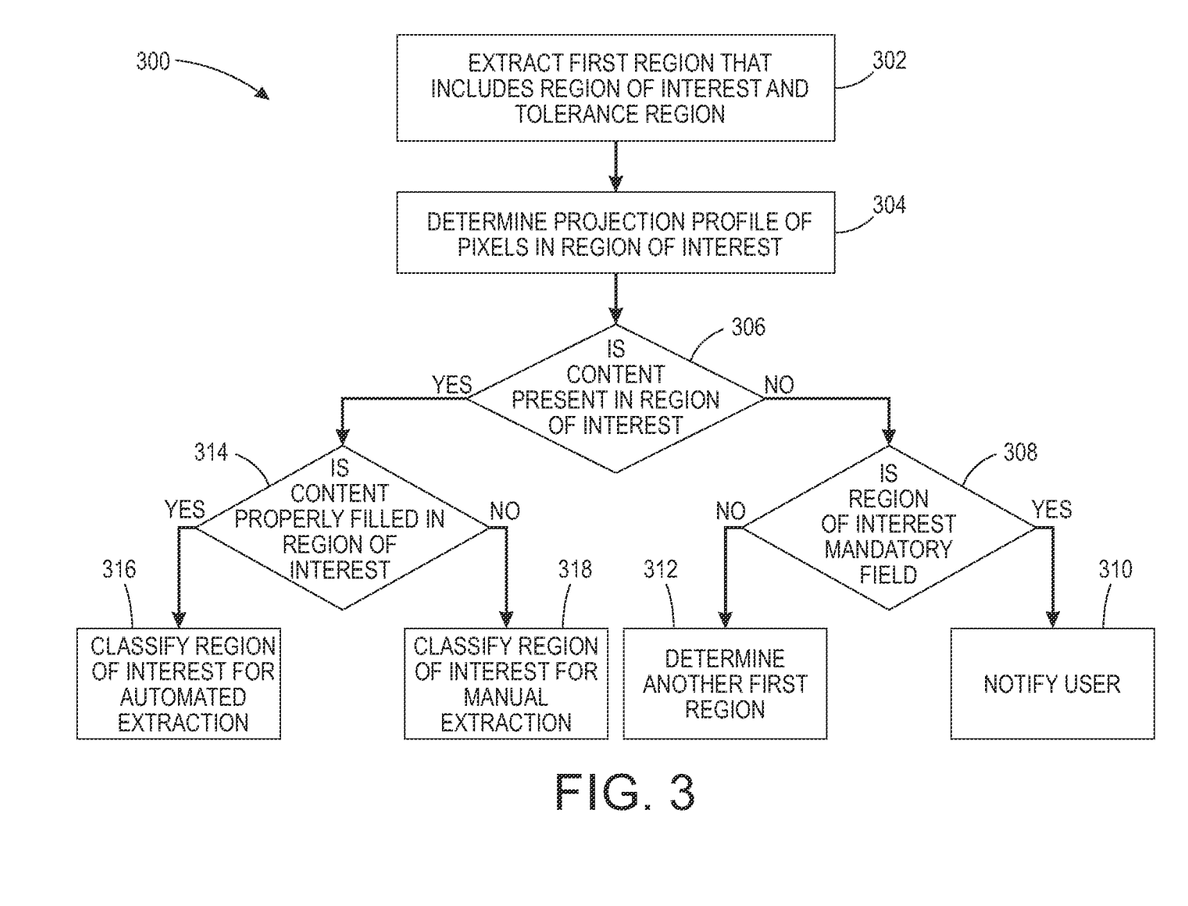
FIG. 3 is a first flowchart illustrating a method for processing an electronic document, in accordance with at least one embodiment.

The operation of the MFD 104 for processing the electronic document has been described in conjunction with FIG. 3.

FIG. 3 is a flowchart 300 illustrating a method for processing an electronic document, in accordance with at least one embodiment. The flowchart 300 is described in conjunction with FIG. 1 and FIG. 2.

At step 302, a first region is extracted from the electronic document. In an embodiment, the processor 202 may extract the first region based on the first set of coordinates. As discussed, the processor 202 may determine the first set of coordinates based on the template electronic document. Further, the processor 202 may determine the values of the height/width of each of the region on interest (included in the first region) and the tolerance region, based on the template electronic document. Prior to extracting the first region, the MFD 104 may receive the electronic document from at least one of the user-computing device 102 or the database server 106. In an embodiment, the electronic document may be generated by the MFD 106 (e.g., by scanning the corresponding handwritten/printed document). Thereafter, based on the first set of coordinates and the height/width information for the region of interest and tolerance region, the processor 202 may extract the first region. For example, the processor 202 may first locate the first set of coordinates in the electronic document, and may subsequently determine the boundaries of the first region based on the values of the height/width associated with each of the region of interest and tolerance region. As discussed above, the first region includes the region of interest, which includes the content that is to be extracted (e.g., printed information and handwritten information), and the tolerance region along the boundary of the region of the interest. Further illustration of the extraction of the first region has been discussed in conjunction with FIG. 5A and FIG. 5B.

At step 304, first projection profile of pixels in the region of interest is determined. The processor 202 determines the first projection profile of pixels. In an embodiment, the processor 202 may sum up the intensity values of the pixels, along the horizontal/vertical direction of the region of interest to determine the first projection profile of pixels. Thus, the first projection profile corresponds to the presence of the pixel values in the corresponding areas of the region of interest.

At step 306, it is determined whether content is present in the region of interest. The processor 202 determines the presence of the content in the region of interest based on the determined first projection profile. As discussed, the first projection profile corresponds to the presence of the content in the respective area in the region of interest. In an embodiment, if content is present in the region of interest, the processor 202 identifies that the first projection profile includes some pattern associated with it; whereas if no content is present in the region of interest, the first projection profile will be null. Based on such information about first projection profile, the processor 202 may determine if there is any content in the region of interest. If it is determined that no content is present in the region of interest, step 308 is performed else, step 314 is performed.

At step 308, the processor 202 further determines whether the region of interest corresponds to a field in the electronic document that is mandatory to be filled by the user. In an embodiment, certain fields (i.e. regions of interest) in the electronic document may be defined as mandatory, and information about such regions of interest may be provided by the user. In an embodiment, such information may be stored in the database server 106, and the processor 202 may extract the information, as and when required. As an example, it might be stored in the database server 106 that the region of interest "NAME" in the electronic document corresponding to an application form is mandatory. If it is determined that the region of interest is mandatory, step 310 is performed else, step 312 is performed.

At step 310, the processor 202 may notify the user about the unavailability of the content in the mandatory region of interest. That is, if the processor 202 determines that no content is present in the region of interest that is stored as mandatory region of interest, the processor 202 may notify the user for the same. In this way, it is ensured that if the user has not filled content in a region of interest that he/she was supposed to, the user may be notified for the same. The processor 202 may notify the user based on one or more known techniques, such as, but not limited to, an email message, a short message service (SMS), a pop-up message on a display associated with the user-computing device 102, and the like.

At step 312, the processor 202 continues the extraction of other regions of interest in the electronic document. That is, if it is determined that content is not present in the region of interest and that the region of interest is not mandatory, the processor 202 may search for another region of interest in the electronic document.

As discussed, if at step 306 it is determined that content is present in the region of interest, step 314 is performed.

At step 314, the processor 202 further determines whether the content is properly filled (i.e. written) in the region of interest. In an embodiment, the processor 202 determines the properness of the content based on the predetermined projection profiles associated with the region of interest. As discussed, the predetermined projection profile corresponds to the projection profile associated with a region of interest based on the content, which is supposed to be written by the user, in the region of interest. In an embodiment, the processor 202 may compare the determined first projection profile with the predetermined projection profile to determine if the user has properly written the content in the region of interest. For example, if the user has written the information such that some of the portion of the content is outside the region of interest, the first projection profile may not be similar to the predetermined projection profile. In a similar way, if the region of interest has been skewed during scanning of the paper document (e.g., due to deformation in the paper document), the first projection profile may not be similar to the predetermined projection profile. Thus, based on the comparison of the first projection profile and the predetermined projection profile, the processor 202 may determine whether the content has been properly written by the user. If it is determined that the user has properly written the content in the region of interest, step 316 is performed else, step 318 is performed.

At step 316, the region of interest is classified in the category for automated extraction. That is, if the processor 202 determines that the content is properly written by the user in the region of interest, the region of interest may be transmitted for automated extraction (e.g., through OCR and ICR).

At step 318, the region of interest is classified in the category for manual extraction. That is, if the processor 202 determines that the content is not properly written in the extracted region of interest, the processor 202 may transmit the region of interest for manual extraction. As discussed, the content in the region of interest may not be proper due to one or more reasons (e.g., the user writing the content outside the region of interest, skew in the electronic document, improper extraction of the region of interest based on the first set of coordinates, and the like). In such scenarios, in an embodiment, the processor 202 may validate and correct the extraction of the region of interest in the electronic document, as described in conjunction with the FIG. 4.

Figure 4:
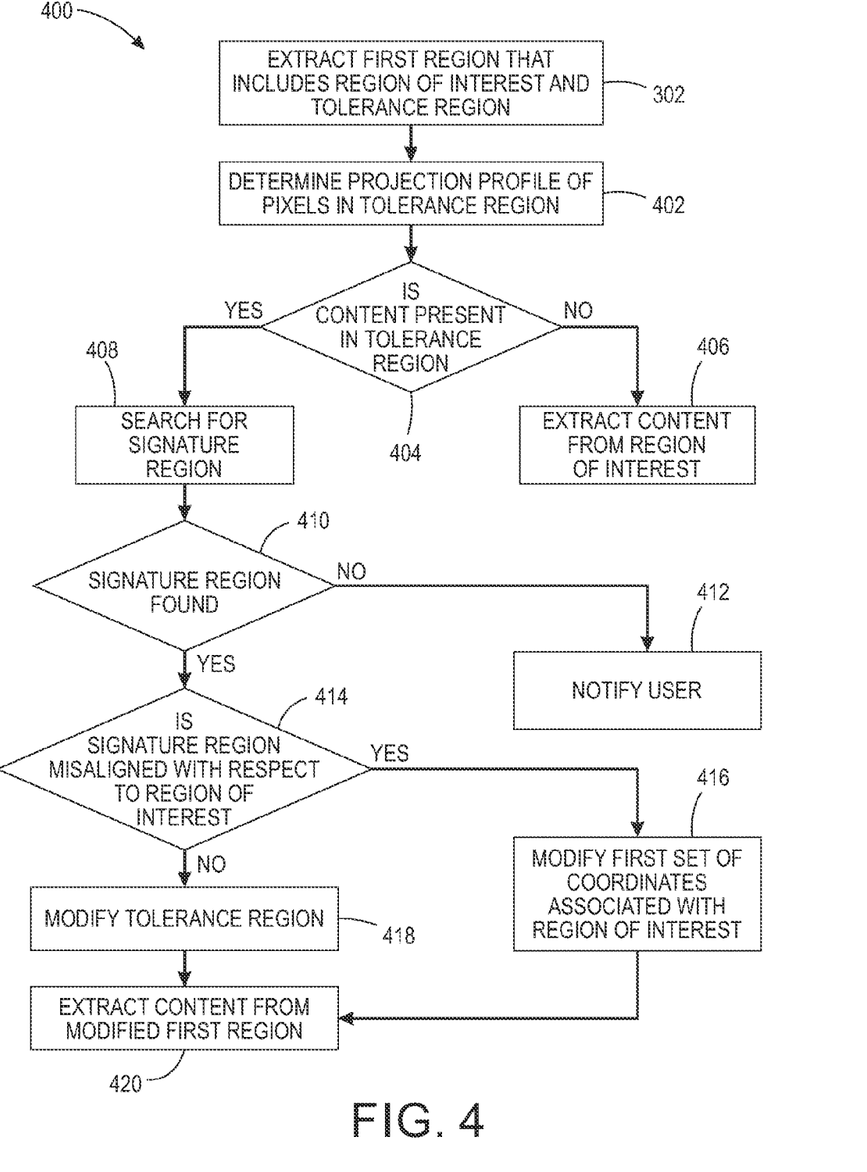
FIG. 4 is a second flowchart illustrating a method for processing an electronic document, in accordance with at least one embodiment.

FIG. 4 is a flowchart 400 illustrating another method for processing an electronic document, in accordance with at least one embodiment. The flowchart 400 is described in conjunction with FIG. 1, FIG. 2, and FIG. 3.

Step 302, as depicted in the flowchart 400, has already been described in conjunction with the FIG. 3.

At step 402, a second projection profile of pixels in the tolerance region is determined. In an embodiment, the processor 202 determines the second projection profile to determine the availability of the content in the tolerance region (e.g., when the user writes the content outside the region of interest). Further, as discussed in conjunction with FIG. 3, the processor 202 may determine the second projection profile based on the sum of intensity values of the pixels present in the tolerance region. In an embodiment, the processor 202 determines the second projection profile of pixels in each of the four directions (i.e., right, left, up, and down) of the region of interest to determine the availability of the content in respective direction.

At step 404, it is determined whether content is present in the tolerance region. The processor 202 determines the availability of the content in the tolerance region based on the second projection profile. In an embodiment, if content is present in the tolerance region that will correspond to some pattern in the second projection profile along at least one of the four directions. Based on such information, the processor 202 determines the availability of the content in the tolerance region. If it is determined that content is not present in the tolerance region, step 406 is performed else, step 408 is performed.

At step 406, content from the region of interest is extracted. In an embodiment, once it is determined that the tolerance region does not include any content then it may correspond to the properness of the content in the region of interest. Thus, the processor 202 may extract the content from the region of interest. The processor 202 may extract the content based on the one or more known techniques in the art such as, but not limited to, OCR, ICR, and the like.

At step 408, the processor 202 searches for the signature region corresponding to the field encompassed in the first region, in the electronic document. That is, if it is determined that the tolerance region includes some content then it may correspond to the fact that the content is written in the region of interest in an improper manner. In an embodiment, by searching the signature region, the processor 202 determines the reason of such improperness. That is, the processor 202 determines whether the user has written the content outside the region of interest or the improperness is because of skew introduced while scanning of the document. In an embodiment, the processor 202 may determine the second set of coordinates based on the template electronic document. Subsequently, the processor 202 may search the signature region based on the determined second set of coordinates.

At step 410, it is determined whether the signature region is found in the electronic document. In an embodiment, the electronic document may be generated (e.g., through scanning of the paper/handwritten document) in such an improper manner that the second set of coordinates associated with the signature region cannot be found in the generated electronic document. In such a scenario, if the processor 202 determines that signature region is available (i.e., it is found) in the electronic document, step 414 is performed else, step 412 is performed.

At step 412, the processor 202 may notify the user about the unavailability of the signature region in the electronic document. For example, if the processor 202 determines in the step 410 that the signature region corresponding to the field "NAME" in the electronic document cannot be found, the processor 202 may notify the user about this. It will be apparent to a person skilled in the art that based on the notification, the user may consider generating the electronic document again (e.g., by again scanning the paper/handwritten document).

At step 414, the processor 202 determines whether the signature region is misaligned with the region of interest. That is, if the processor 202 finds the second set of coordinates in the electronic document, the processor 202 may subsequently determine the alignment of the signature region with respect to the region of interest. In an embodiment, the processor 202 may determine the predetermined relationship between the signature region and the region of interest. For example, based on the template electronic document, the processor 202 may determine how far and in which direction first set of coordinates and the second set of coordinates are separated. In an embodiment, due to deformation in the paper/handwritten document, this relationship may be disturbed in the generated electronic document and the processor 202 determines such disturbance through the predetermined relationship. If the processor 202 determines that the signature region and the region of interest are misaligned (i.e., these two regions are not in accordance with the predetermined relationship), the processor 202 may perform step 416 else, the processor 202 may perform step 418.

At step 416, the processor 202 modifies the first set of coordinates in the electronic document. That is, if the processor 202 determines that the signature region is misaligned with respect to the region of the interest, the processor 202 may modify the first set of coordinates such that the signature region and the region of interest are aligned in accordance with the predetermined relationship. Further, the processor 202 may extract a modified first region with modified region of interest (i.e., with modified first set of coordinates) from the electronic document.

At step 418, the processor 202 modifies the tolerance region. In an embodiment, if the processor 202 determines that the signature region is not misaligned with respect to the region of interest, the processor 202 may modify the tolerance region based on a predefined threshold value. For example, the processor 202 may modify the tolerance region by 10% in each of the four directions, if it is determined that the signature region is aligned with respect to the region of interest.

In another embodiment, the processor 202 may determine the projection profile of complete first region and may compare the determined projection profile with predetermined projection profile associated with the first region (e.g., based on expected content to be written in the region of interest). In such a scenario, the processor 202 may modify the tolerance region until the determined projection profile of the extracted first region encompasses the complete spilled over content in the tolerance region.

At step 420, the processor 202 extracts the content from the modified first region. As discussed above, the modified first region either includes the modified first set of coordinates or includes modified tolerance region. The processor 202 may extract the content from the modified first region based on the known techniques (e.g., OCR and ICR).

In an embodiment, the flowcharts 300 and 400 may be combined to process an electronic document. For example, once it is determined that the content is not properly written in the region of interest (i.e., in conjunction with the step 314) and post categorizing the region of interest for manual category (i.e., in conjunction with the step 318), the processor 202 may perform the steps 402 to steps 420, without departing from the scope of the disclosure.

Figure 5A:
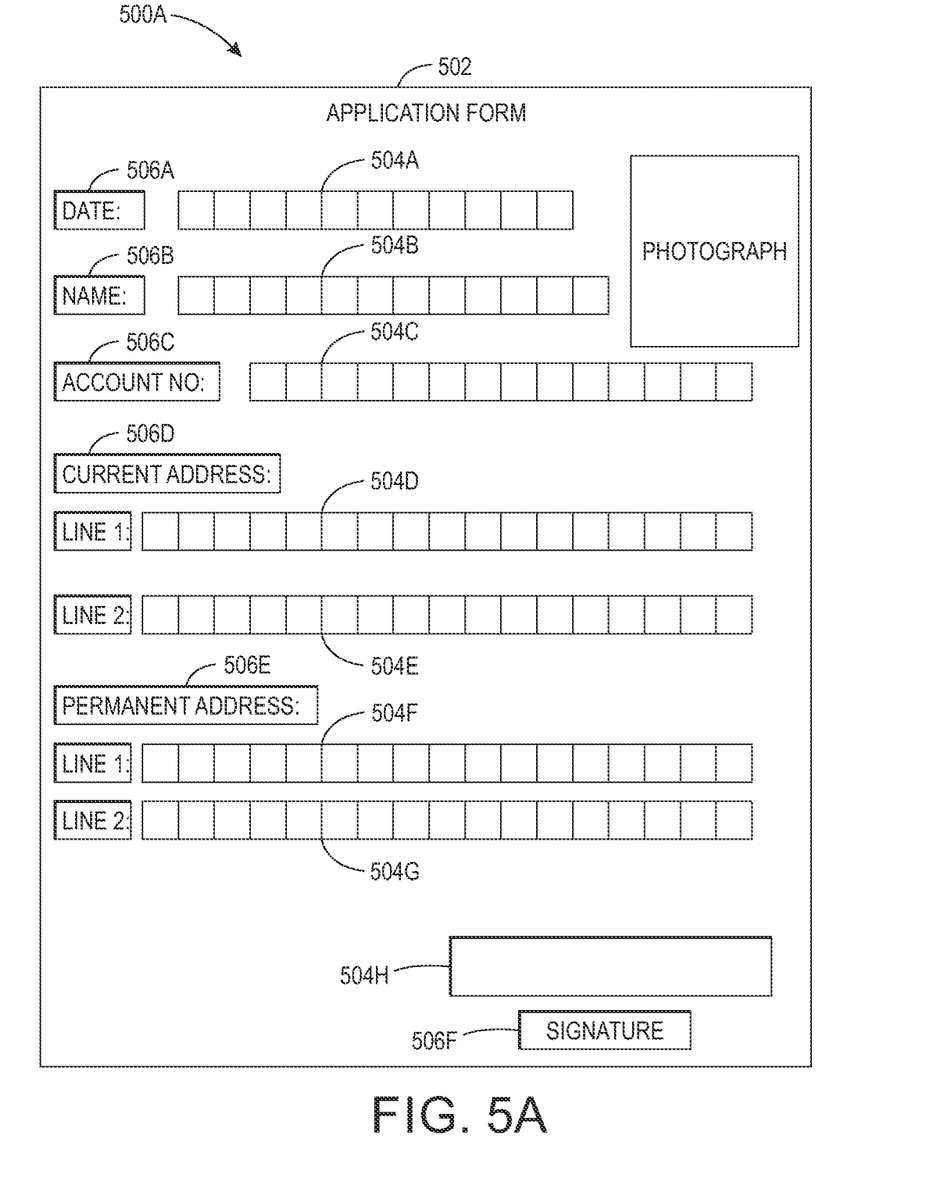
FIG. 5A and FIG. 5B illustrate block diagrams illustrating a method for processing an electronic document, in accordance with at least one embodiment.
Figure 5B:
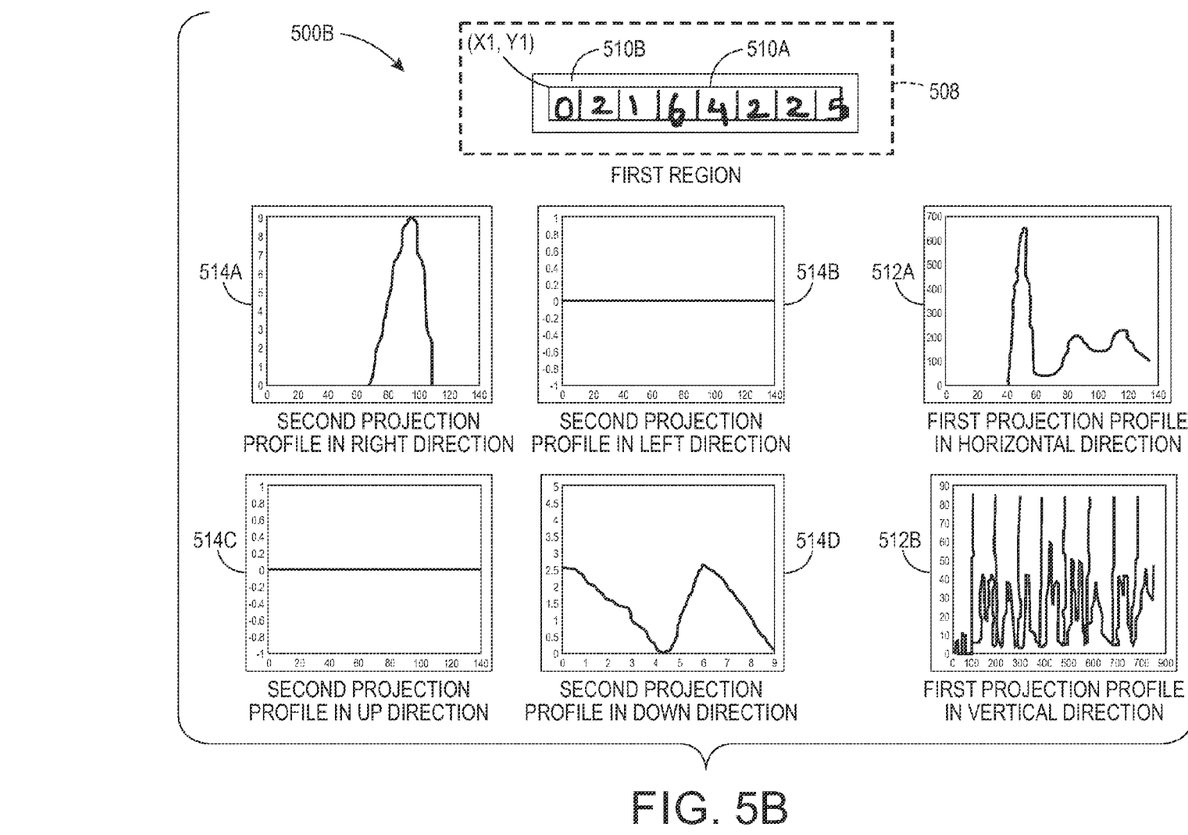

FIG. 5A and FIG. 5B illustrate block diagrams 500a and 500b, respectively, in accordance with at least one embodiment. The block diagram 500a includes a template electronic document 502. The template electronic document 502 further includes region of interests 504a-504h and respective signature regions 506a-506f. For example, as depicted, the signature region 506a corresponds to the region of interest 504a. Further, each of the regions of interests 504a-504h corresponds to an area that the user may utilize to provide information (i.e., content), and each of the signature regions 506a-506f corresponds to an area that specifies what information is required to be provided by the user (e.g., date, name, and account number).

The block diagram 500b includes the first region 508, first projection profiles 512a-b, and second projection profiles 514a-d, in accordance with at least one embodiment. The first region 508 includes the region of interest 510a and tolerance region 510b. As depicted, the first region 508 is extracted from the electronic document (not shown in the block diagram 500a/500b), in which the user has written the content. Further, as depicted in the block diagram 500b, the user has not written the content in a proper manner. That is, some of the content is written outside the region of interest 510a. The block diagram 500b also depicts the first set of coordinates (X1, Y1) associated with the region of interest 510a.

FIG. 5A and FIG. 5B have now been explained in conjunction with the FIG. 2, FIG. 3, and FIG. 4.

In accordance with the step 302, the first region 508 is extracted. The processor 202 extracts the first region 508 based on the first set of coordinates (X1, Y1). As discussed, the processor 202 may determine the first set of coordinates (X1, Y1) based on the template electronic document 502. For example, the processor 202 may first determine the boundaries of the template electronic document 502 and different regions of interest 504a-h, using the image processing techniques known in the art. Subsequently, the processor 202 may determine the coordinates associated with each of the regions of interest 504a-h and the signature regions 506a-f.

In accordance with the step 304, the first projection profiles 512a-b are determined. The processor 202 determines the first projection profiles 512a and 512b corresponding to the region of interest 510a in the horizontal and vertical direction, respectively. That is, as depicted, the first projection profile 512a corresponds to the availability of pixel values along the horizontal direction of the region of interest 510a, and the first projection profile 512b corresponds to the availability of pixel values along the vertical direction of the region of interest 510a.

In accordance with the step 306, the processor 202 determines whether content is present in the region of interest 510a. As discussed in conjunction with FIG. 3, the processor 202 may determine the availability of the content based on the first projection profile associated with the respective region of interest. In an embodiment, based on the first projection profiles 512a-b, the processor 202 determines that content is present in the region of interest 510a. Thus, the processor 202 executes the step 314, in accordance with the flowchart 300.

In accordance with the step 314, the processor 202 determines the properness of the content in the region of interest 510a. As discussed in conjunction with FIG. 3, the processor 202 may determine the properness of the content in the region of interest 510a based on the first projection profiles 512a-b. In an embodiment, the processor 202 may compare the first projection profiles 512a-b with the predetermined projection profiles associated with the region of interest 510a. For example, the processor 202 may compare the peak positions in the first projection profile 512a-b with the peak positions in the respective predetermined projection profiles associated with the region of interest 510a. In an embodiment, the processor 202 determines that the content has not been written in proper manner (i.e. some of the content is outside the specified region of interest 510a). Thus, in accordance with the flowchart 300, step 318 is performed.

At step 318, the processor 202 classifies the region of interest 510a in a category for manual extraction. That is, if the processor 202 determines that the content is not written in the region of interest 510 in an expected manner, the processor 202 may classify the region of interest 510a for manual extraction (since automated extraction techniques such as OCR/ICR may incorrectly extract the content).

It will be apparent to a person skilled in the art that the processor 202 may process different regions of interest in the electronic document in a similar manner. Further, based on the determination made by the processor 202 at the step 306, step 308, and 310, the processor 202 may traverse the flowchart 300 accordingly while processing the electronic document.

In accordance with the step 402, the processor 202 determines second projection profiles 514a-d. The processor 202 determines the second projection profiles 514a-d corresponding to the content present in the tolerance region 510b. As discussed in conjunction with FIG. 3, the tolerance region may include a predetermined area along the boundary of the region of interest. For example, as depicted in the block diagram 500b, the tolerance region 510b extends in each of the four directions (i.e., right, left, up, and down) from the region of interest 510a. As discussed, if the user writes the content in the region of interest 510a in an improper manner, some portion of the content may spill over in the tolerance region 510b. Thus, the processor 202 determines the second projection profiles 514a-d to determine the availability of such content.

In accordance with the step 404, the processor 202 determines whether content is present in the tolerance region 510b. In an embodiment, to determine the availability of content in the right direction of the region of interest 510a, the processor 202 utilizes the second projection profile 514a, and so forth. The processor 202 determines, based on the second projection profiles 514a and 514d, that the content is present in the right side and in down side, as depicted in the block diagram 500b. Thus, in accordance with the flowchart 400, the processor 202 performs step 408.

In accordance with the step 408, the processor 202 searches for the signature region associated with the region of interest 510a. As discussed in conjunction with the flowchart 400, based on the template electronic document 502, the processor 202 may determine the second set of coordinates associated with each of signature regions included in the electronic document. Further, the processor 202 may determine a relationship between the position of signature region and respective region of interest. For example, the processor 202 may determine the relative position of the second set of coordinates with the respective first set of coordinates. Thus, in accordance with the step 408, the processor 202 searches for the second set of coordinates associated with the signature region that is corresponding to the region of interest 510a.

In accordance with the step 410, the processor 202 determines whether the signature region corresponding to the region of interest 510a is found in the electronic document. That is, the processor 202 searches for the second set of coordinates associated with the signature region corresponding to the region of interest 510a. If the processor 202 finds the second set of coordinates in the electronic document, step 414 is performed in accordance with the flowchart 400 else, step 412 is performed. That is, if the signature region is not found in the electronic document, the processor 202 may notify the user (e.g., to re-scan the paper/handwritten document), as discussed in the flowchart 400.

In accordance with the step 414, the processor 202 determines whether the signature region is misaligned with respect to the region of interest 510a. In an embodiment, the processor 202 may determine the alignment of the region of interest 510a with the signature region based on the determined relationship between the first set of coordinates and the second set of coordinate. For example, the processor 202 may determine the distance/orientation of the second set of coordinates from the first set of coordinates to determine the misalignment. In case the processor 202 determines that the signature region is misaligned with respect to the region of interest 510a step 416 is performed else, step 418 is performed, as discussed in conjunction with the flowchart 400.

In accordance with the step 416, the processor 202 modifies the first set of coordinates (X1, Y1). That is, if the processor 202 determines that the second set of coordinates associated with the signature region is not in accordance with the predetermined relationship with the first set of coordinates (X1, Y1) associated with the region of interest 510a, the processor 202 may modify the values of (X1, Y1) such that the modified values are in accordance with the relationship with the searched second set of coordinates. For example, if the processor 202 determines that the Y-coordinates are not same for the second set of coordinates and the first set of coordinates (that should be if both, the signature region and the region of interest 510a are adjacent to each other), the processor 202 may modify only Y1 such that signature region and the modified region of interest (not shown) are adjacent to each other. In a similar way, the processor 202 may modify the value of X-coordinate associated with the region of interest 510a.

In accordance with the step 418, the processor 202 modifies the tolerance region 510b. That is, if the processor 202 determines that the second set of coordinates are in accordance with the predetermined relationship with the first set of coordinates, the processor 202 may modify the tolerance region 510b. In an embodiment, the motivation for the modification of the tolerance region 510b may be that availability of the content in the tolerance region 510b (when signature region and region of interest 510a are aligned as expected) may be due the user writing some content outside the region of interest 510a. Thus, by modifying the tolerance region 510b, the processor 202 may include (for extraction) the spilled over content present in the tolerance region 510b. The processor 202 may modify the tolerance region 510b in each of the directions by a value that may be pre-configured on the MFD 104. For example, it may be configured that the tolerance region 510b may be modified by 5% in each of the four directions. In this way, the portion of the content that is spilled over the region of interest 510a may be taken care of by the processor 202.

In accordance with the step 420, the processor 202 may extract the content from the modified first region. That is, if the processor 202 modifies the first set of coordinates (in accordance with the step 416) the processor 202 may extract the modified region of interest (using the height/width of the region of interest). Subsequently, the processor 202 may extract the content from the modified region of interest. In a similar way, if the processor 202 modifies the tolerance region 510b (in accordance with the step 418), the processor 202 may extract the content from the modified first region such that content that is spilled over in the tolerance region 510b is also extracted.

The disclosed embodiments encompass numerous advantages. During automated processing of electronic documents, typically, the regions of interest are extracted based on the template electronic documents, as discussed above. However, since the electronic documents may include regions of interest in which content is not written by the user in an expected/proper manner, automated content extraction techniques (e.g., OCR and ICR) may not correctly identify the content. Thus, in such scenarios, where content is not written by the users in a proper manner, respective regions of interest should be sent for manual extraction of the content. In addition, if some of the mandatory regions of interest are not filled by the users, extracting such mandatory regions of interests and transmitting for automated extraction may lead to extra costs for automated extractions. Through various embodiments of methods and systems as discussed above, it is disclosed that based on the properness of the content, the extracted regions of interest may be classified either for automated extraction or for manual extraction. That is, if it is determined that the content is properly written then the regions of interest may be processed for automated extraction else, manual intervention may be determined. In this way, accuracy for the extraction of the content may be improved. Further, the cost associated with the automated extraction may be reduced, since typically for content extraction, charges are applied on a per-use basis. In addition, notifying the user about content being not filled in the mandatory region of interest may ensure that the user writes all the content that he/she is expected to. In addition, as discussed, the user may be notified if the count for the categorized regions of interest for manual extraction crosses a predetermined threshold. In this way, if the electronic document has been generated (e.g., using scanning) in an erroneous way, the user may be notified for the manual intervention.

In addition, through various embodiments, it is disclosed that the predetermined relationship between the signature region and the region of interest is considered to determine any skew introduced while generating the electronic document. Any such skew may be corrected by modifying the first set of coordinates associated with the region of interest. Further, if the user writes the content outside the expected region of interest, taking into account the tolerance region may improve the accuracy in determining the content, since the tolerance region may be modified if it is determined that it includes some of the content. Thus, it is disclosed that not only improperness in the electronic document may be determined, but also corrections/modifications may be performed in the extracted regions of interests to improve the content extraction accuracy.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++', Java, and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for processing documents have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for classifying a region of interest in an electronic document, the method comprising:
   extracting, by one or more processors, a first region from said electronic document, wherein said first region includes said region of interest and a tolerance region, wherein said tolerance region corresponds to a pre-defined area along a boundary of said region of interest;
   determining, by said one or more processors, a first projection profile of pixels in said region of interest, wherein said first projection profile is indicative of a presence of a content in said region of interest; and
   classifying, by said one or more processors, said region of interest in at least one category based on a comparison of said first projection profile with a predetermined projection profile associated with said region of interest.

2. The method of claim 1, wherein said at least one category corresponds to a manual extraction of said content from said region of interest or an automated extraction of said content from said region of interest.

3. The method of claim 2 further comprising transmitting, by said one or more processors, said classified region of interest to a user for said manual extraction based on the classification.

4. The method of claim 3 further comprising notifying, by said one or more processors, a user when a predetermined number of said region of interests in said electronic document are classified for said manual extraction.

5. The method of claim 1, wherein said first region is extracted based at least on a first set of co-ordinates associated with said region of interest, said tolerance region, and a second set of co-ordinates associated with a signature region, wherein said signature region is associated with said region of interest based on an association between said first set of co-ordinates and said second set of co-ordinates.

6. The method of claim 5 further comprising determining, by said one or more processors, a second projection profile of pixels in said tolerance region, wherein said second projection profile is indicative of a presence of a spill over content, associated with said content in said region of interest, in said tolerance region.

7. The method of claim 6 further comprising modifying said tolerance region in said first region, by said one or more processors, when said spill over content is present in said tolerance region, based on a comparison of a third projection profile associated with a modified first region and said predetermined projection profile, wherein said modified first region comprises said region of interest and said modified tolerance region.

8. The method of claim 6 further comprising modifying, by said one or more processors, said first set of co-ordinates associated with said region of interest based on said association between said first set of co-ordinates and said second set of co-ordinates.

9. The method of claim 8 further comprising extracting, by said one or more processors, said content from a modified first region, wherein said modified first region comprises at least one of a modified tolerance region or said modified first set of co-ordinates.

10. The method of claim 9, wherein said content is extracted using at least one of optical character recognition or intelligent character recognition.

11. The method of claim 1 further comprising notifying, by said one or more processors, a user about said presence of said content in said region of interest.

12. A system for classifying a region of interest in an electronic document, the system comprising:
one or more processors operable to:
extract a first region from said electronic document, wherein said first region includes said region of interest and a tolerance region, wherein said tolerance region corresponds to a pre-defined area along a boundary of said region of interest;
determine a first projection profile of pixels in said region of interest, wherein said first projection profile is indicative of a presence of a content in said region of interest; and
classify said region of interest in at least one category based on a comparison of said first projection profile with a predetermined projection profile associated with said region of interest.

13. The system of claim 12, wherein said at least one category corresponds to a manual extraction of said content from said region of interest or an automated extraction of said content from said region of interest.

14. The system of claim 13, wherein said one or more processors are further operable to transmit said classified region of interest to a user for said manual extraction based on the classification.

15. The system of claim 14, wherein said one or more processors are further operable to notify a user when a pre-determined number of said region of interests in said electronic document are classified for said manual extraction.

16. The system of claim 12, wherein said first region is extracted based at least on a first set of co-ordinates associated with said region of interest, said tolerance region, and a second set of coordinates associated with a signature region, wherein said signature region is associated with said region of interest based on an association between said first set of co-ordinates and said second set of co-ordinates.

17. The system of claim 16, wherein said one or more processors are further operable to determine a second projection profile of pixels in said tolerance region, wherein said second projection profile is indicative of a presence of a spill over content, associated with said content in said region of interest, in said tolerance region.

18. The system of claim 17, wherein said one or more processors are further operable to modify said tolerance region, when said spill over content is present in said tolerance region based on a comparison of a third projection profile associated with a modified first region and said predetermined projection profile, wherein said modified first region comprises said region of interest and said modified tolerance region.

19. The system of claim 17, wherein said one or more processors are further operable to modify said first set of coordinates associated with said region of interest based on said association between said first set of co-ordinates and said second set of coordinates.

20. The system of claim 19, wherein said one or more processors are further operable to extract said content from a modified first region, wherein said modified first region comprises at least one of a modified tolerance region or said modified first set of co-ordinates.

21. The system of claim 20, wherein said content is extracted using at least one of optical character recognition or intelligent character recognition.

22. The system of claim 12, wherein said one or more processors are further operable to notify a user about said presence of said content in said region of interest.

23. A computer program product for use with a computer, the computer program product comprising a non-transitory computer readable medium, wherein the non-transitory computer readable medium stores a computer program code for classifying a region of interest in an electronic document, wherein the computer program code is executable by one or more processors to:
extract a first region from said electronic document, wherein said first region includes said region of interest and a tolerance region, wherein said tolerance region corresponds to a pre-defined area along a boundary of said region of interest;
determine a first projection profile of pixels in said region of interest, wherein said first projection profile is indicative of a presence of a content in said region of interest; and
classify said region of interest in at least one category based on a comparison of said first projection profile with a predetermined projection profile associated with said region of interest.

* * * * *